US007369652B1

(12) United States Patent
Liang et al.

(10) Patent No.: US 7,369,652 B1
(45) Date of Patent: May 6, 2008

(54) COMBINING SIGNALS AT A CONFERENCE BRIDGE

(75) Inventors: William W. Liang, Santa Clara, CA (US); Cullen F. Jennings, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1135 days.

(21) Appl. No.: 10/436,906

(22) Filed: May 13, 2003

(51) Int. Cl.
*H04M 3/42* (2006.01)

(52) U.S. Cl. .............................. 379/202.01; 379/206.01
(58) Field of Classification Search ............ 379/202.01
See application file for complete search history.

(56) References Cited

U.S. PATENT DOCUMENTS

| | | | | |
|---|---|---|---|---|
| 4,467,143 A | | 8/1984 | Warman ...................... 179/18 |
| 4,658,398 A | * | 4/1987 | Hsing ......................... 370/267 |
| 4,860,366 A | * | 8/1989 | Fukushi et al. ............. 381/106 |
| 5,353,351 A | | 10/1994 | Bartoli et al. ................. 380/33 |
| 5,596,635 A | * | 1/1997 | Rao ....................... 379/202.01 |
| 5,724,416 A | | 3/1998 | Foladare et al. ............ 379/202 |
| 6,226,513 B1 | | 5/2001 | Wierzbicki et al. ......... 455/416 |
| 6,298,323 B1 | * | 10/2001 | Kaemmerer ................ 704/246 |
| 7,231,381 B2 | * | 6/2007 | Li et al. ......................... 707/3 |
| 2001/0025240 A1 | * | 9/2001 | Bartosik ..................... 704/201 |
| 2001/0031650 A1 | * | 10/2001 | Baiker et al. ............... 455/570 |

* cited by examiner

*Primary Examiner*—Creighton Smith
(74) *Attorney, Agent, or Firm*—Baker Botts L.L.P.

(57) ABSTRACT

Combining signals includes receiving signals from communication devices, where each signal is associated with a content describing the signal. The following is repeated for each signal: the content associated with a signal is examined, whether the signal is a voice signal is determined in accordance with the content, and the signals are sent to a signal combiner in accordance with the determination of whether the signal is a voice signal. The signals are combined at the signal combiner.

16 Claims, 2 Drawing Sheets

COMBINING SIGNALS AT A CONFERENCE BRIDGE

TECHNICAL FIELD OF THE INVENTION

This invention relates generally to the field of telecommunications and more specifically to combining signals at a conference bridge.

BACKGROUND OF THE INVENTION

Conference calls involve combining audio or video signals from multiple communication devices while maintaining the quality of the signals. Signal quality may be affected by, for example, music on hold, ambient noise from a cell phone, or someone typing in the background. Known techniques for avoiding this type of signal degradation involve muting or dropping a particular participant. These known techniques, however, require the intervention of a user. Consequently, known techniques for combining signals may not be suitable in certain situations.

SUMMARY OF THE INVENTION

In accordance with the present invention, disadvantages and problems associated with previous techniques for combining signals at a conference bridge may be reduced or eliminated.

According to one embodiment of the present invention, combining signals includes receiving signals from communication devices, where each signal is associated with a content describing the signal. The following is repeated for each signal: the content associated with a signal is examined, whether the signal comprises a voice signal is determined in accordance with the content, and the signals are sent to a signal combiner in accordance with the determination of whether the signal comprises a voice signal. The signals are combined at the signal combiner.

Certain embodiments of the invention may provide one or more technical advantages. A technical advantage of one embodiment may be that the content of the signals is examined in order to determine whether signals are voice signals. The signals that are voice signals are combined at the conference bridge. By using the content to determine whether the signals are voice signals, the conference bridge may more effectively combine signals while maintaining signal quality.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
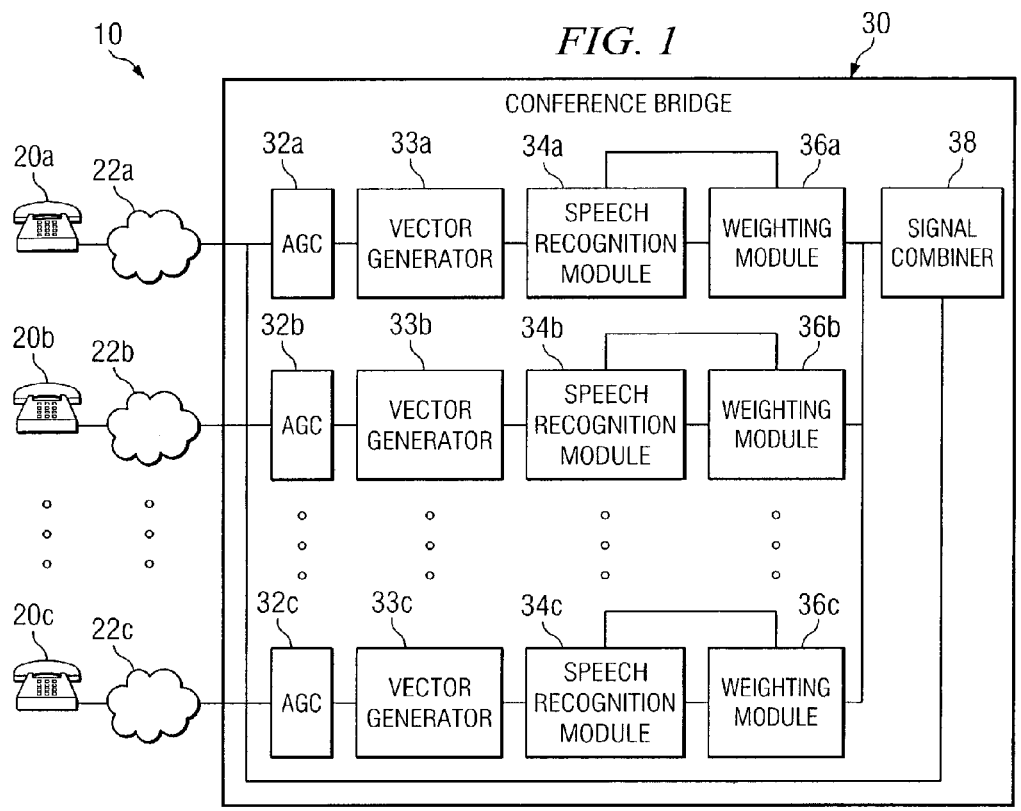
FIG. 1 is a block diagram of a system for combining signals.

FIG. 1 is a block diagram of a system 10 for combining signals. System 10 includes a conference bridge that has a speech recognition module. The speech recognition module examines the content of signals received from multiple communication devices to determine whether the signals comprise voice signals. The conference bridge combines the signals in accordance with the determination in order to generate a combined signal that is sent to the communication devices.

According to the illustrated embodiment, system 10 includes communication devices 20*a-c* that communicate with a conference bridge 30 through communication networks 22*a-c*. A communication device 20*a-c* may send and receive audio signals, video signals, or any combination of the preceding. The signals may communicate information such as data, video, multimedia, any other suitable type of information, or any combination of the preceding. Communication device 20*a-c* may comprise, for example, a telephone, a cellular telephone, a mobile handset, or any other device suitable for communicating signals to and from system 10. Communication device 20*a-c* may support, for example, simple Internet Protocol (IP), mobile IP, or any other suitable communication protocol. Communication device 20*a-c* may utilize, for example, Global System for Mobile communications (GSM) technology or any other suitable communication technology.

Communication network 22*a-c* allows communication device 20*a-c* to communicate with other networks or devices. Communication network 22*a-c* may comprise a public switched telephone network (PSTN), a public or private data network, the Internet, a wireline or wireless network, a local, regional, or global communication network, an enterprise intranet, other suitable communication link, or any combination of the preceding.

Conference bridge 30 determines whether the content of signals received from communication devices 20*a-c* comprises voice signals, combines the signals that are determined to comprise voice signals to generate a combined signal, and sends the combined signal to communication devices 20*a-c*. Conference bridge 30 includes automatic gain control (AGC) circuits 32*a-c*, vector generators 33*a-c*, speech recognition modules 34*a-c*, weighting modules 36*a-c*, and a signal combiner 38. Automatic gain control circuits 32*a-c* control the amplitude of signals received from communication devices 20*a-c*. Automatic gain control circuits 32 may be used to bring the amplitude of the signals to the same level to equalize the signals.

Vector generator 33*a-c* generates a feature vector that describes the features of a signal. Speech recognition module 34*a-b* may use the feature vector to determine whether the signal comprises a voice signal. Each feature vector may comprise values for variables that describe certain features of a signal. For example, a feature vector may comprise a frequency value for a variable that represents the frequency of the signal. "Each" as used in this document refers to each member of a set or each member of a subset of a set. Other features may be represented by a frequency vector, for example, the duration and energy level at a given frequency.

Fast Fourier transforms, discrete cosine transforms, wavelet techniques, or other suitable technique may be used to determine the feature vector of a signal.

Speech recognition module 34a-c examines the content of a signal to determine whether the signal comprises a voice signal. Content may include, for example, the frequency spectrum of the signal with respect to time. Example frequency spectrums of music and voice signals are described with reference to FIGS. 2 and 3, respectively. Content, however, may include any feature suitable for determining whether a signal comprises a voice signal. The content may be provided by feature vectors generated by vector generators 33a-c.

Speech recognition module 34a-c may perform speech recognition for a signal in any suitable manner. For example, speech recognition module 34a-c may compare a feature vector for the signal to a voice signal vector that describes the ranges of typical feature values for voice signals. If the values of the feature signal fall within the ranges of the typical values, the signal may be designated as comprising a voice signal. Other suitable procedures for performing speech recognition, however, may be used.

Speech recognition may be performed at any suitable time or for any suitable signals. For example, speech recognition module 34a-c may continuously or periodically check whether a signal comprises a voice signal. As another example, speech recognition may be performed only for streams that are designated as active. Active streams may comprise, for example, signals that have amplitude greater than a threshold amplitude.

Speech recognition module 34a-c may be located at any part of system 10 where there is access to the signal and processing power for determining whether the signal comprises a voice signal. For example, speech recognition module 34 may be located at communication device 20a-c, a gateway or node that communicates a signal between communication device 20a-c and conference bridge 30, at conference bridge 30, or at any other point where speech recognition module 30 can determine whether the signal comprises a voice signal.

Weighting modules 36a-c weight the signals in response to instructions from speech recognition modules 34a-c. According to one embodiment, a weighting module 36a-c assigns weights to the signals that indicate the contribution of the signal to the combined signal. A higher weight indicates a greater contribution and a lower weight indicates a lesser contribution. The weight may influence a signal in any suitable manner, such as by adjusting the signal gain or volume of the signal. If a speech recognition module 34a-c indicates that a signal comprises a voice signal, weighting module 36a-c provides the signal with a higher weight. If speech recognition module 34a-c indicates that a signal does not comprise a voice signal, weighting module 36a-c provides the signal with a lower weight.

According to another embodiment, weighting module 36a-c may comprise a switch that transmits or blocks the signals in response to an instruction from speech recognition module 34a-c. If speech recognition module 34a-c indicates that the signal comprises a voice signal, the switch may be said to transmit the signal to signal combiner 38 by assigning the signal a maximum weight. If speech recognition module 38a-c indicates that the signal is not a voice signal, the switch may be said to block the signal from being transmitted to signal combiner 38 by assigning the signal a minimum weight.

Along with speech recognition module 34a-c, weighting module 36a-c may be located at any part of system 10 where there is access to the signal and processing power for weighting the signal. For example, weighting module 36a-c may be located at communication device 20a-c, a gateway or node that communicates a signal between communication device 20a-c and conference bridge 30, at conference bridge 30, or at any other point where weighting module 36a-c can weight the signal.

Signal combiner 38 combines the signals received from weighting modules 36a-c. The signals comprising voice signals have a higher weight than that of the signals that do not comprise voice signals. Accordingly, the combined signals include more voice signals than other types of signals. The combined signals are transmitted back to communication devices 20a-c.

Modifications, additions, or omissions may be made to the system without departing from the scope of the invention. For example, vector generators 33a-c may be omitted, and speech recognition module 34a-c may use other procedures for determining whether the signal comprises a voice signal. Additionally, functions may be performed using any suitable logic comprising software, hardware, other logic, or any suitable combination of the preceding.

Figure 2:
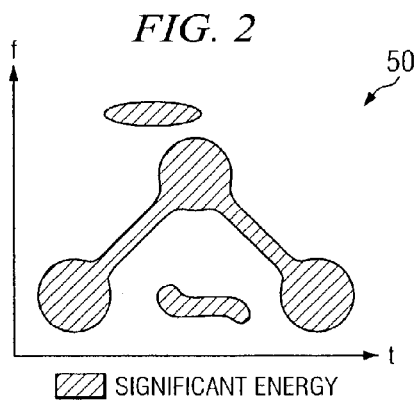
FIGS. 2 and 3 are example graphs illustrating the differences between a voice frequency spectrum and a music frequency spectrum.
Figure 3:
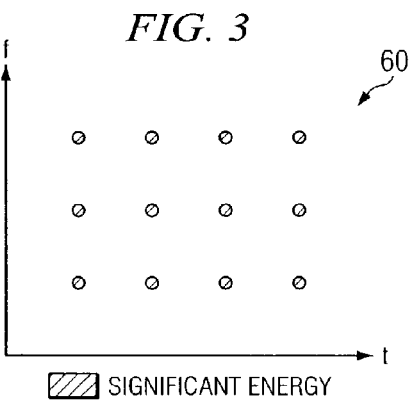

FIGS. 2 and 3 are example graphs illustrating the differences between an example voice frequency spectrum and an example music frequency spectrum. FIG. 2 is a graph 50 illustrating an example voice frequency f spectrum with respect to time t. The shaded regions indicate significant energy present at frequency f at time t. Voice signals typically have frequencies that fall within a range of approximately 100 to 2,500 Hz. As illustrated by graph 50, frequencies f of voice signals at a time t typically fall within a small number of frequency ranges, each with a spread of approximately 50 Hz. As time t increases, the frequencies f may smoothly shift to another a small range of frequencies.

FIG. 3 is a graph 52 illustrating an example music frequency spectrum with respect to time t. Signals other than voice signals have frequencies f that often do not fall within the range of voice signal frequencies. Moreover, other types of signals have frequencies that typically do not smoothly shift as time t increases. For example, graph 52 illustrates music signals that have frequencies f that fall outside of the typical range of voice signal frequencies. Moreover, the frequencies f do not smoothly shift as time t increases.

Figure 4:
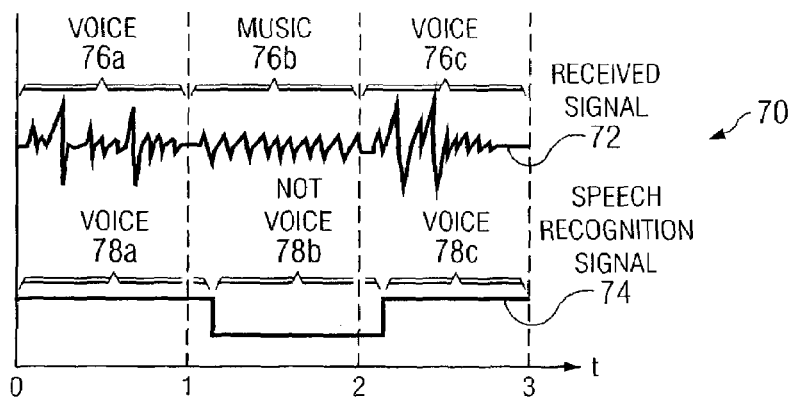
FIG. 4 is a graph illustrating an example latency situation.

FIG. 4 is a graph 70 illustrating an example latency situation. Graph 70 illustrates a received signal 72 and a speech recognition signal 74 with respect to time t. Received signal 72 is received from a communication device 20a-c. Speech recognition signal 74 indicates whether received signal 72 comprises a voice signal, and may be generated by speech recognition module 34a-c.

Received signal 72 includes segments 76a-c of voice and music signals. Segment 76a comprises a voice signal, segment 76b comprises a music signal, and segment 76c comprises a voice signal. Speech recognition signal 74 includes segments 78a-c that indicate whether received signal 72 includes voice signals. Segment 78a indicates that received signal 72 comprises a voice signal, segment 78b indicates that received signal 72 does not include a voice signal, and segment 78c indicates that received signal 72 comprises a voice signal.

As illustrated by graph 70, there is a delay time between when received signal 72 changes to a voice signal or to an other type of signal and the time at which speech recognition signal 74 indicates whether received signal 72 is a voice signal or an other type of signal. The delay time, however, is relatively short such as approximately 100 milliseconds. The short delay time is typically acceptable for telephone conferences since speakers often make an initial sound such as "uh" or "excuse me" before interjecting into a conversation.

Figure 5:
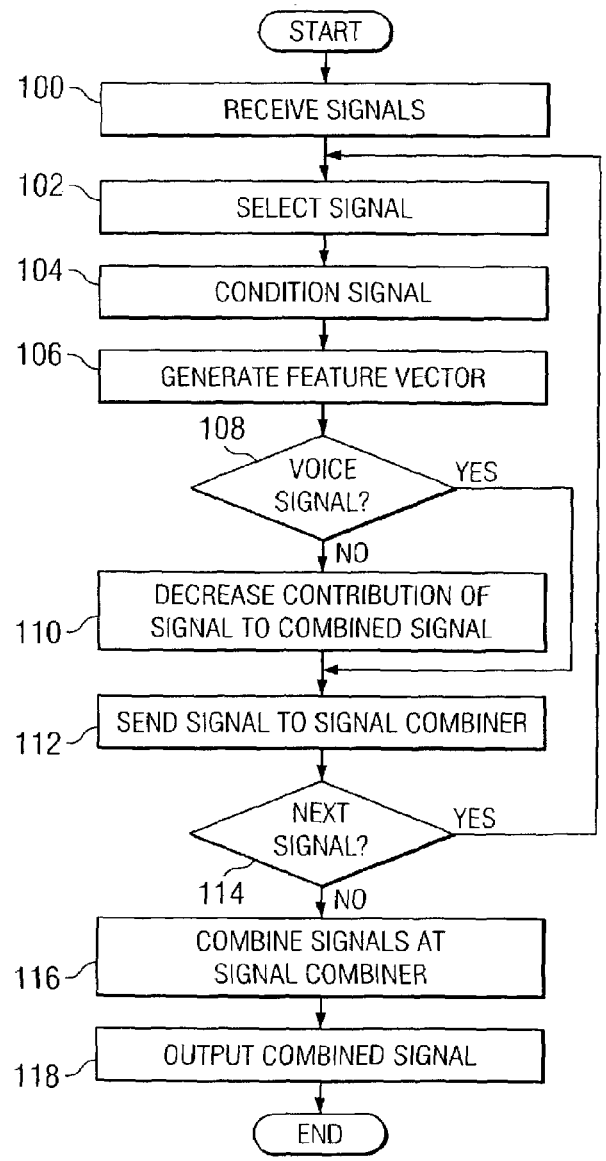
FIG. 5 is a flowchart illustrating one embodiment of a method for combining signals.

FIG. 5 is a flowchart illustrating one embodiment of a method for combining a plurality of signals. The method begins at step 100, where conference bridge 30 receives signals from communication devices 20a-c. A signal from a communication device 20a-c is selected at step 102. Automatic gain control circuits 32a-c condition the signal at step 104. Vector generator 33a-c generates a feature vector for the signal at step 106. The feature vector describes features that may be used to determine whether the signal comprises a voice signal.

Speech recognition module 34a-c determines whether the signal comprises a voice signal at step 108. Speech recognition module 34a-c may generate a speech recognition signal that indicates whether the signal comprises a voice signal. If the signal does not comprise a voice signal, the method proceeds to step 110, where the contribution of the signal to the combined signal is decreased. Weighting module 36a-c may decrease the contribution of the signal by assigning the signal a low or zero weight. The method then proceeds to step 112. If the signal comprises a voice signal at step 108, the method proceeds directly to step 112.

Weighting module 36a-c sends the signal, if any, to signal combiner 38 at step 112. If there is a next signal at step 114, the method returns to step 102 to select the next signal. If there is no next signal at step 114, the method proceeds to step 116. Signal combiner 38 combines the signals at step 116. Signals that have been determined to comprise voice signals contribute more to the combined signal than signals that have been determined to comprise other types of signals. The combined signal is output at step 118. After outputting the combined signal, the method terminates.

Modifications, additions, or omissions may be made to the method without departing frog the scope of the invention. Additionally, steps may be performed in any suitable order without departing from the scope of the invention.

Certain embodiments of the invention may provide one or more technical advantages. A technical advantage of one embodiment may be that the content of the signals is examined in order to determine whether signals are voice signals. The signals that are voice signals are combined at the conference bridge. By using the content to determine whether the signals are voice signals, the conference bridge may more effectively combine signals while maintaining signal quality.

Although an embodiment of the invention and its advantages are described in detail, a person skilled in the art could make various alterations, additions, and omissions without departing from the spirit and scope of the present invention as defined by the appended claims.

What is claimed is:

1. A method for combining a plurality of signals, comprising:
   receiving a plurality of signals from a plurality of communication devices, each signal received from a communication device, each signal associated with a content describing the signal;
   repeating the following for each signal of the plurality of signals:
      examining the content associated with a signal;
      determining whether the signal comprises a voice signal in accordance with the content; and
      sending the signal to a signal combiner in accordance with the determination of whether the signal comprises a voice signal by assigning a higher weight to the signal if the signal comprises a voice signal, assigning a lower weight to the signal if the signal comprises another type of signal, and sending the signal to the signal combiner in accordance to the assignment; and
   combining the signals at the signal combiner.

2. The method of claim 1, wherein determining whether the signal comprises a voice signal in accordance with the content comprises:
   generating a feature vector for the signal, the feature vector describing the content associated with the signal;
   comparing the feature vector to a voice signal vector describing a typical voice signal; and
   determining whether the signal comprises a voice signal in accordance with the comparison.

3. The method of claim 1, wherein determining whether the signal comprises a voice signal in accordance with the content comprises:
   identifying a frequency spectrum associated with the signal; and
   determining whether the signal comprises a voice signal in accordance with the frequency spectrum.

4. The method of claim 1, wherein determining whether the signal comprises a voice signal in accordance with the content comprises determining whether the signal comprises a voice signal in accordance with the content at a speech recognition module.

5. The method of claim 1, wherein sending the signals to the signal combiner in accordance with the determination of whether the signal comprises a voice signal comprises:
   sending the signal to the signal combiner if the signal comprises a voice signal; and
   blocking the signal if the signal comprises another type of signal.

6. Logic for combining a plurality of signals, the logic embodied in a medium and operable to:
   receive a plurality of signals from a plurality of communication devices, each signal received from a communication device, each signal associated with a content describing the signal;
   repeat the following for each signal of the plurality of signals:
      examine the content associated with a signal;
      determine whether the signal comprises a voice signal in accordance with the content; and
      send the signal to a signal combiner in accordance with the determination of whether the signal comprises a voice signal by assigning a higher weight to the signal if the signal comprises a voice signal, assigning a lower weight to the signal if the signal comprises another type of signal, and sending the signal to the signal combiner in accordance to the assignment; and
   combine the signals at the signal combiner.

7. The logic of claim 6, operable to determine whether the signal comprises a voice signal in accordance with the content by:
   generating a feature vector for the signal, the feature vector describing the content associated with the signal;
   comparing the feature vector to a voice signal vector describing a typical voice signal; and
   determining whether the signal comprises a voice signal in accordance with the comparison.

8. The logic of claim 6, operable to determine whether the signal comprises a voice signal in accordance with the content by:

identifying a frequency spectrum associated with the signal; and determining whether the signal comprises a voice signal in accordance with the frequency spectrum.

9. The logic of claim 6, operable to determine whether the signal comprises a voice signal in accordance with the content by determining whether the signal comprises a voice signal in accordance with the content at a speech recognition module.

10. The logic of claim 6, operable to send the signals to the signal combiner in accordance with the determination of whether the signal comprises a voice signal by:

sending the signal to the signal combiner if the signal comprises a voice signal; and blocking the signal if the signal comprises another type of signal.

11. A system for combining a plurality of signals, comprising:

a speech recognition module operable to:

receive a plurality of signals from a plurality of communication devices, each signal received from a communication device, each signal associated with a content describing the signal; and repeat the following for each signal of the plurality of signals:

examine the content associated with a signal; and determine whether the signal comprises a voice signal in accordance with the content;

a weighting module coupled to the speech recognition module and operable to transmit each signal in accordance with the determination of whether the signal comprises a voice signal by assigning a higher weight to the signal if the signal comprises a voice signal, assigning a lower weight to the signal if the signal comprises another type of signal, and transmitting the signal in accordance to the assignment; and a signal combiner coupled to the weighting module and operable to:

receive the transmitted signals; and combine the signals.

12. The system of claim 11, further comprising a vector generator operable to generate a feature vector for the signal, the feature vector describing the content associated with the signal, the speech recognition module being operable to determine whether the signal comprises a voice signal in accordance with the content by:

comparing the feature vector to a voice signal vector describing a typical voice signal; and determining whether the signal comprises a voice signal in accordance with the comparison.

13. The system of claim 11, wherein the speech recognition module is operable to determine whether the signal comprises a voice signal in accordance with the content by:

identifying a frequency spectrum associated with the signal; and determining whether the signal comprises a voice signal in accordance with the frequency spectrum.

14. The system of claim 11, wherein the weighting module comprises a switch operable to send the signals to the signal combiner in accordance with the determination of whether the signal comprises a voice signal by:

sending the signal to the signal combiner if the signal comprises a voice signal; and blocking the signal if the signal comprises another type of signal.

15. A system for combining a plurality of signals, comprising:

means for receiving a plurality of signals from a plurality of communication devices, each signal received from a communication device, each signal associated with a content describing the signal;

means for repeating the following for each signal of the plurality of signals:

examining the content associated with a signal;

determining whether the signal comprises a voice signal in accordance with the content; and sending the signal to a signal combiner in accordance with the determination of whether the signal comprises a voice signal by assigning a higher weight to the signal if the signal comprises a voice signal, assigning a lower weight to the signal if the signal comprises another type of signal, and sending the signal to the signal combiner in accordance to the assignment; and means for combining the signals at the signal combiner.

16. A method for combining a plurality of signals, comprising:

receiving a plurality of signals from a plurality of communication devices, each signal received from a communication device, each signal associated with a content describing the signal, and repeating the following for each signal of the plurality of signals:

examining the content associated with a signal and determining whether the signal comprises a voice signal at a speech recognition module in accordance with the content by:

generating a feature vector for the signal, the feature vector describing the content associated with the signal, comparing the feature vector to a voice signal vector describing a typical voice signal, and determining whether the signal comprises a voice signal in accordance with the comparison; and identifying a frequency spectrum associated with the signal, and determining whether the signal comprises a voice signal in accordance with the frequency spectrum; and sending the signal to a signal combiner in accordance with the determination of whether the signal comprises a voice signal by:

assigning a higher weight to the signal if the signal comprises a voice signal, assigning a lower weight to the signal if the signal comprises another type of signal, and sending the signal to the signal combiner in accordance to the assignment; and sending the signal to the signal combiner if the signal comprises a voice signal, and blocking the signal if the signal comprises another type of signal; and combining the signals at the signal combiner.

* * * * *